United States Patent [19]
Sawada et al.

[11] Patent Number: 5,623,381
[45] Date of Patent: Apr. 22, 1997

[54] DISK DRIVE

[75] Inventors: Toru Sawada, Furukawa; Takuya Nagai, Sendai; Shinkichi Sasaki; Takuya Wakayama, both of Furukawa, all of Japan

[73] Assignee: Alps Electric Co., Ltd., Tokyo, Japan

[21] Appl. No.: 589,814

[22] Filed: Jan. 22, 1996

Related U.S. Application Data

[63] Continuation of Ser. No. 297,669, Aug. 29, 1994, abandoned, which is a continuation of Ser. No. 63,179, May 17, 1993, abandoned.

[30] Foreign Application Priority Data

May 18, 1992 [JP] Japan ..................... 4-124916
May 18, 1992 [JP] Japan ..................... 4-124917

[51] Int. Cl.⁶ .............. G11B 5/012; G11B 17/04
[52] U.S. Cl. ................. 360/97.01; 360/99.06
[58] Field of Search ............. 360/99.06, 98.08, 360/98.07, 98.06, 97.01, 97.02, 98.01, 99.12, 99.05, 99.04, 99.01, 900, 903; 361/685

[56] References Cited

U.S. PATENT DOCUMENTS 4,639,863  1/1987  Harrison et al. ............. 361/685
4,772,965  9/1988  Kato et al. .
5,056,078  10/1991 Carey et al. ............. 369/77.2
5,179,482  1/1993  Tanaka et al. ............. 360/97.01

FOREIGN PATENT DOCUMENTS 0467556  1/1992  European Pat. Off. .

*Primary Examiner*—Stuart S. Levy
*Assistant Examiner*—Allen Cao
*Attorney, Agent, or Firm*—Guy W. Shoup; Patrick T. Bever

[57] ABSTRACT

A disk drive particularly, a disk drive into which a disk cartridge containing a magnetic disk as an information recording medium is loaded when used. A flexible printed circuit board mounting circuit parts for a spindle motor thereon is used as board and fixed to a back yoke, thereby constituting the spindle motor. A lower cover is provided with an opening, the flexible printed circuit board is interposed between a chassis and the lower cover, and the back yoke is assembled by being inserted into the opening of the lower cover. When the disk cartridge is inserted, it is obliquely inserted so that the disk cartridge will not strike against any magnetic heads.

2 Claims, 16 Drawing Sheets

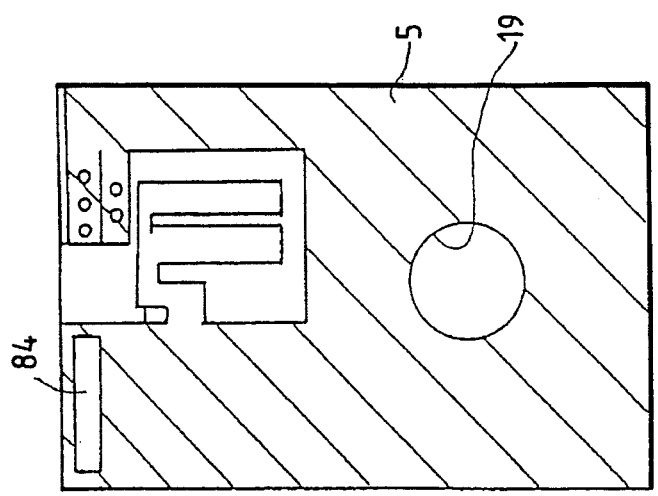
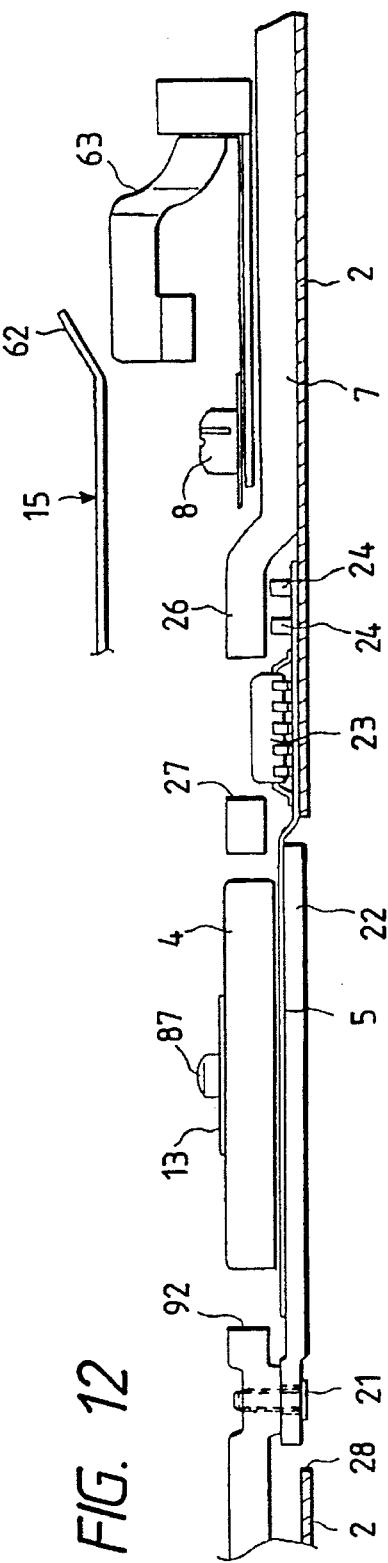
FIG. 11
FIG. 12

FIG. 20(a)
FIG. 20(b)
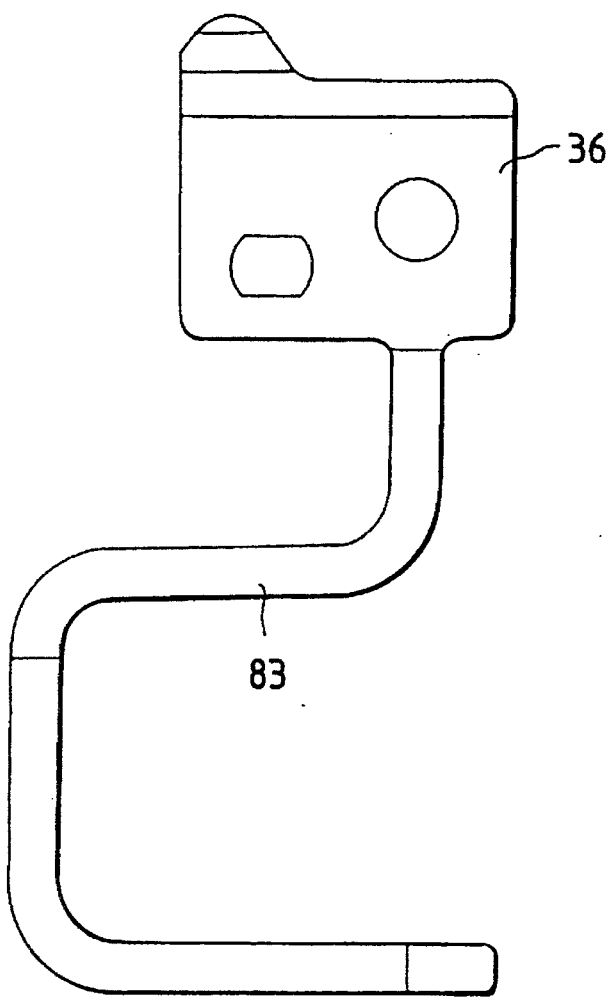
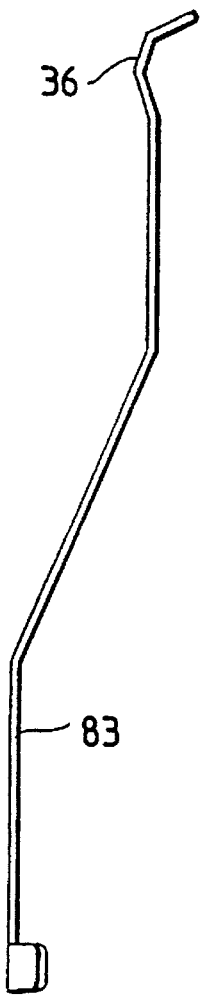
FIG. 20(c)
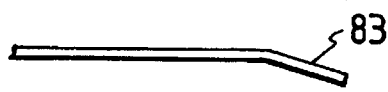

DISK DRIVE

This application is a continuation of app;ication Ser. No. 08/297,669 filed Aug. 29, 1994, which is a continuation of application Ser. No. 08/063,179, filed May 17, 1993, both now abandoned.

FIELD OF THE INVENTION

The present invention relates to a disk drive and more particularly to a disk drive into which a disk cartridge containing a magnetic disk as an information recording medium is loaded when used.

DESCRIPTION OF THE RELATED ART

A conventional disk drive of the above-mentioned type primarily comprises a lower cover, a chassis made of an aluminum alloy, a cartridge holder supported on the chassis in a vertically movable manner for holding a disk cartridge when it is inserted into the drive, a turntable for mounting thereon a magnetic disk contained in a case of the disk cartridge, a spindle motor disposed on the underside of the chassis for rotatively driving the turntable, a back yoke attached to the spindle motor, a printed circuit board connected to the spindle motor, upper and lower magnetic heads for performing write/read of signals on both surfaces of the magnetic disk loaded on the turntable, a rotatable hold case for holding the upper magnetic head at its free end, a carriage for holding the lower magnetic head and supporting the hold case rotatably, and a stepping motor for moving the carriage in a radial direction of the magnetic disk.

The vertical movement of the cartridge holder is performed by a well-known cam mechanism in interlock with operation of a movable slide plate. More specifically, when the disk cartridge is inserted up to an innermost position within the cartridge holder, an eject arm is locked by a lock lever with a shutter of the disk cartridge kept open. At the same time, the slide plate is unlocked and moved by resilient force of a spring toward a cartridge insertion opening, whereupon the cartridge holder is lowered by the cam mechanism down to a loaded position. When an eject arm coupled to the slide plate is depressed with the cartridge holder kept in the loaded position, the slide plate is moved toward the innermost side, whereupon the cartridge holder is raised by the cam mechanism. Simultaneously, the lock lever and the eject arm are rotated so that the disk cartridge is moved toward the cartridge insertion opening while keeping the shutter closed, and then ejected out of the drive through the cartridge insertion opening.

Meanwhile, a demand exists in reducing thickness and weight of the above-mentioned type disk drive. In the foregoing prior art, however, the chassis, the spindle motor, etc. are contained in the lower cover. Also, the lower cover, the back yoke, the printed circuit board, and the chassis are arranged in laminated relation. This has been an obstruction to achieve a reduction in total thickness and weight because respective thicknesses of those components are accumulated.

Further, despite such a demand as making thinner the above-mentioned type disk drive, the disk cartridge is horizontally inserted into the cartridge holder in the foregoing prior art. It is therefore required that when the disk cartridge is inserted, the disk cartridge will not strike against the upper and lower magnetic heads respectively located above and below the same. Another requirement to be considered is allowance for a thickness error and warp of the disk cartridge. From these considerations, there has been a limitation in making the drive thinner.

In addition, because control button attaching portions of the slide plate are different in their positions depending on desired usages of disk drives, several types of slide plates with button attaching portions differently positioned have been manufactured to be adapted for various usages. Correspondingly, it has also been required to prepare several types of dies, as well as to manufacture and stock several types of parts for meeting various user demands.

SUMMARY OF THE INVENTION

The present invention has been made in view of the state of art mentioned above, and its object is to provide a disk drive which has a smaller thickness and can easily meet various user demands.

According to the present invention, a flexible printed circuit board (FPC) is used in place of a conventional printed circuit board, circuit parts for a spindle motor are mounted on the FPC, a lower cover is provided with an opening, the FPC is interposed between a chassis and the lower cover, and further a back yoke of the spindle motor is assembled by being inserted into the opening of the lower cover. Therefore, the disk drive can be reduced in thickness.

Also, according to the present invention, when a disk cartridge is inserted, the disk cartridge (or a magnetic disk) is obliquely inserted such that a lower surface of the disk cartridge (or the magnetic disk) will not strike against the lower magnetic head. Specifically, for insertion of the disk cartridge into the cartridge holder, the distance between the lower surface of the disk cartridge and a shaft end of a turntable, the distance between an upper surface of the disk cartridge and a shaft end of a turntable, the distance between an upper surface of the disk cartridge and an upper magnetic head in its innermost peripheral position, and the distance between the lower surface of the disk cartridge and the lower magnetic head in its outermost peripheral position are set equal to one another. Accordingly, as compared with the prior art disk cartridge which is inserted in parallel, the distance from the shaft end of the turntable to the upper magnetic head can be reduced.

Further, according to the present invention, a slide plate is provided with a plurality of integral control button attaching portions, then one or more control button attaching portions at desired positions are removed during installation. Therefore, the need of manufacturing several types of dies and producing and stocking several types parts can be obviated. Thus, just by cutting away the control button attaching portions of the slide plate, produced by using a single die, except one or more at desired positions, the slide plate can be adapted to meet any user requirement. Consequently, the cost relating to the dies, the stocking and so on can be cut down to reduce the total production cost.

BRIEF DESCRIPTION OF THE DRAWINGS

FIG. 11 is an explanatory view showing arrangement of an FPC in the disk drive according to one embodiment of the present invention.

FIG. 12 is a vertical sectional view taken in a direction passing a spindle motor carriage in the disk drive according to one embodiment of the present invention.

FIGS. 20(a), 20(b) and 20(c) are respectively front, side and partial front views showing a shutter retainer for the disk cartridge in the disk drive according to one embodiment of the present invention.

DETAILED DESCRIPTION OF THE PREFERRED EMBODIMENT

Figure 1:
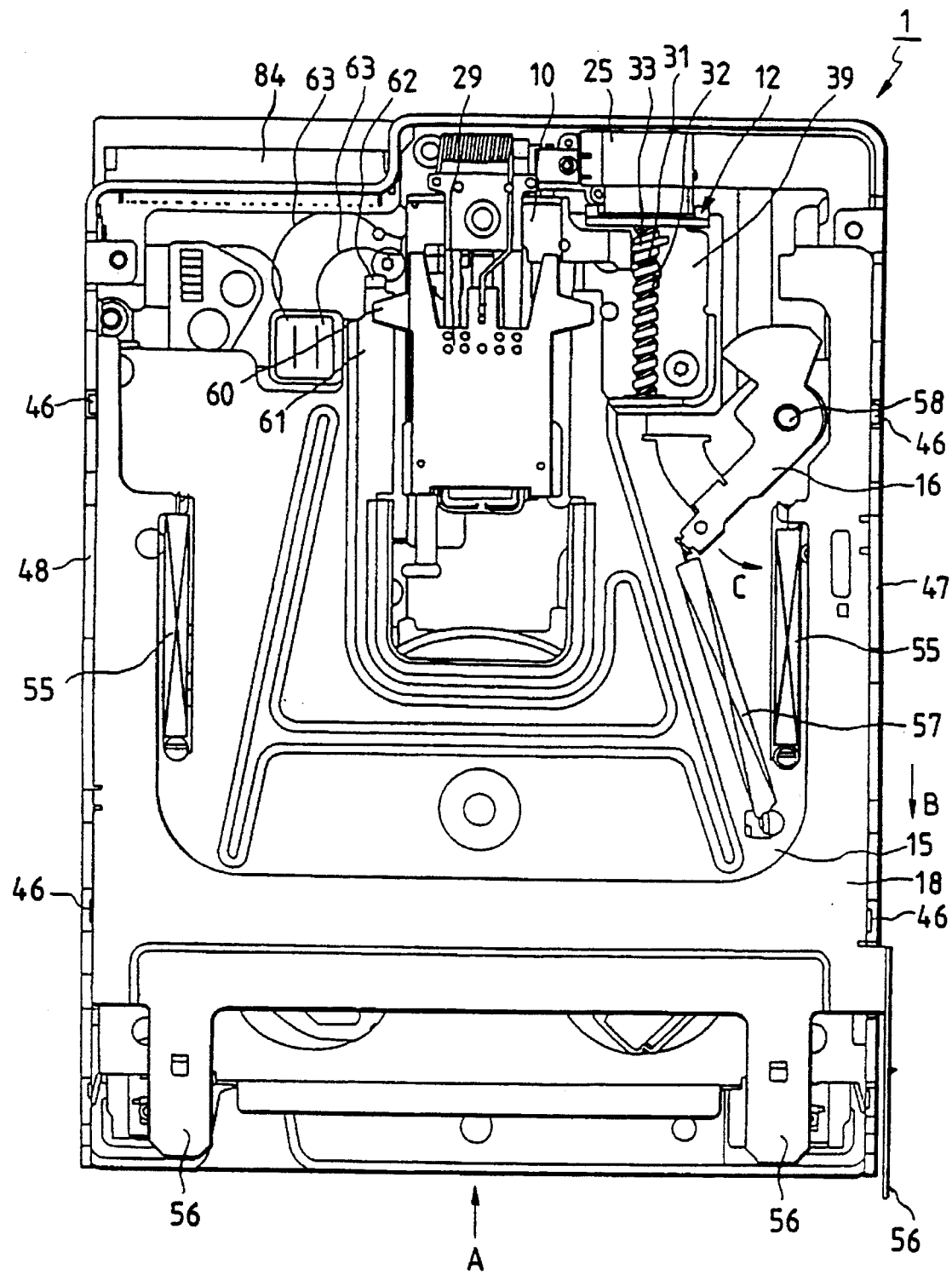
FIG. 1 is a top plan view showing a disk drive according to one embodiment of the present invention.

Hereinafter, one preferred embodiment of the present invention will be described with reference to the attached drawings.

In accordance with the present invention, a disk drive 1 primarily comprises a lower cover 2, a lower insulating sheet 3, a flexible printed circuit board (FPC) 5 connected to a spindle motor 4, an upper insulating sheet 6 disposed on the FPC 5, a chassis 7 disposed via the upper insulating sheet 6, a carriage 10 provided on the chassis 7 and having a pair of magnetic heads 8, 9 attached to its distal end, a carriage shifter 12 for shifting the carriage 10 in a radial direction of a later-described magnetic disk 11, a turntable 13 projecting above the chassis 7 and rotatively driven by the spindle motor 4 attached to the chassis, a cartridge holder 15 for holding a disk cartridge is in the unit and supported to the chassis 7 in a vertically movable manner, a slide plate 18 for vertically moving the cartridge holder 15, an eject lever 16 for introducing the disk cartridge 14 up to a loaded position and pushing it from the loaded position to an eject position, and an upper cover 17.

The chassis 7 is formed by pressing an aluminum alloy, and is provided with the carriage shifter 12 on the rear side of the disk drive 1 unit, i.e., on the upper side in FIG. 1, the turntable 13 on the front side of the unit, i.e., on the lower side in FIG. 1, and further the cartridge holder 15 and the slide plate 18 around the turntable 13. The chassis 7 also has an opening 92 through which the spindle motor 4 is exposed.

As a circuit board, the FPC 5 is used instead of a conventional printed circuit board. The FPC 5 has an opening (not shown) through which a shaft of the spindle motor 4 and a bearing penetrate. The lower cover 2 has an opening 28 through which the spindle motor 4 is exposed. A back yoke (motor yoke) 22 is fixed so as to hold the FPC 5 between itself and the spindle motor in sandwich relation. The back yoke 22 of the spindle motor 4 is assembled by being inserted to the opening 28 of the lower cover 2. The FPC 5 may be bonded to an upper surface of the back yoke 22 by using, for example, a double coated adhesive tape. Denoted by 20 is an FPC retainer formed to project from the chassis 7, 21 is a screw for fastening the chassis 7 and the back yoke 22 together, 23 is an IC device, and 24 is a chip part. The chassis 7 is formed to be projected in areas where there is no limitation in the part height and to be recessed in areas where there is a limitation in the part height. As shown in FIG. 12, the underside of the chassis 7 is brought into close contact with the lower cover 2. In the region where the FPC 5 is interposed, the chassis 7 is formed into a projecting portion 26 so as to accommodate the FPC 5, the IC device 23 and the chip parts 24. While the chip parts 24 can be accommodated in a space defined by the projecting portion 26, the IC device 23 is too high to be placed in that space. Therefore, an opening 27 is formed in the chassis 7 to accommodate the IC device 23 therein. Further, since circuit parts of the stepping motor 25 are mounted on the FPC 5, the size of the back yoke 22 can be reduced correspondingly. In addition, a zero track sensor, the stepping motor 25 and the spindle motor 4 are interconnected by one sheet of FPC 5, and various switches 90 can be directly soldered to the FPC 5. With the FPC 5 held in contact with the lower cover 2 as mentioned above, a reference position can be established by the lower cover 2 and rigidity can be enhanced. Moreover, with the FPC 5 bonded to the back yoke 22, there is no need of fabricating the back yoke 22 such that it can be attached to the FPC 5, thereby enabling a reduction in size of the back yoke 22. Since the opening is formed in the lower cover 2 and the reduced back yoke 22 for the spindle motor 4 is partly placed in the opening 28, the height can also be cut down.

Figure 7:
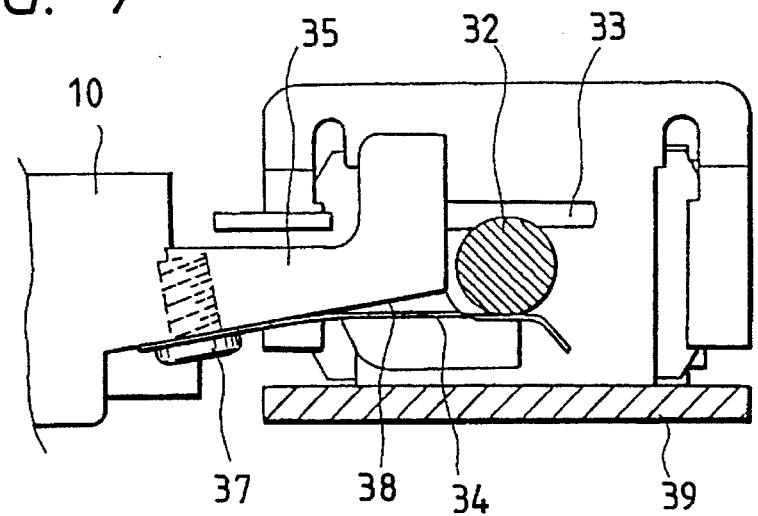
FIG. 7 is an explanatory view showing a carriage driving mechanism in the disk drive according to one embodiment of the present invention.
Figure 8:
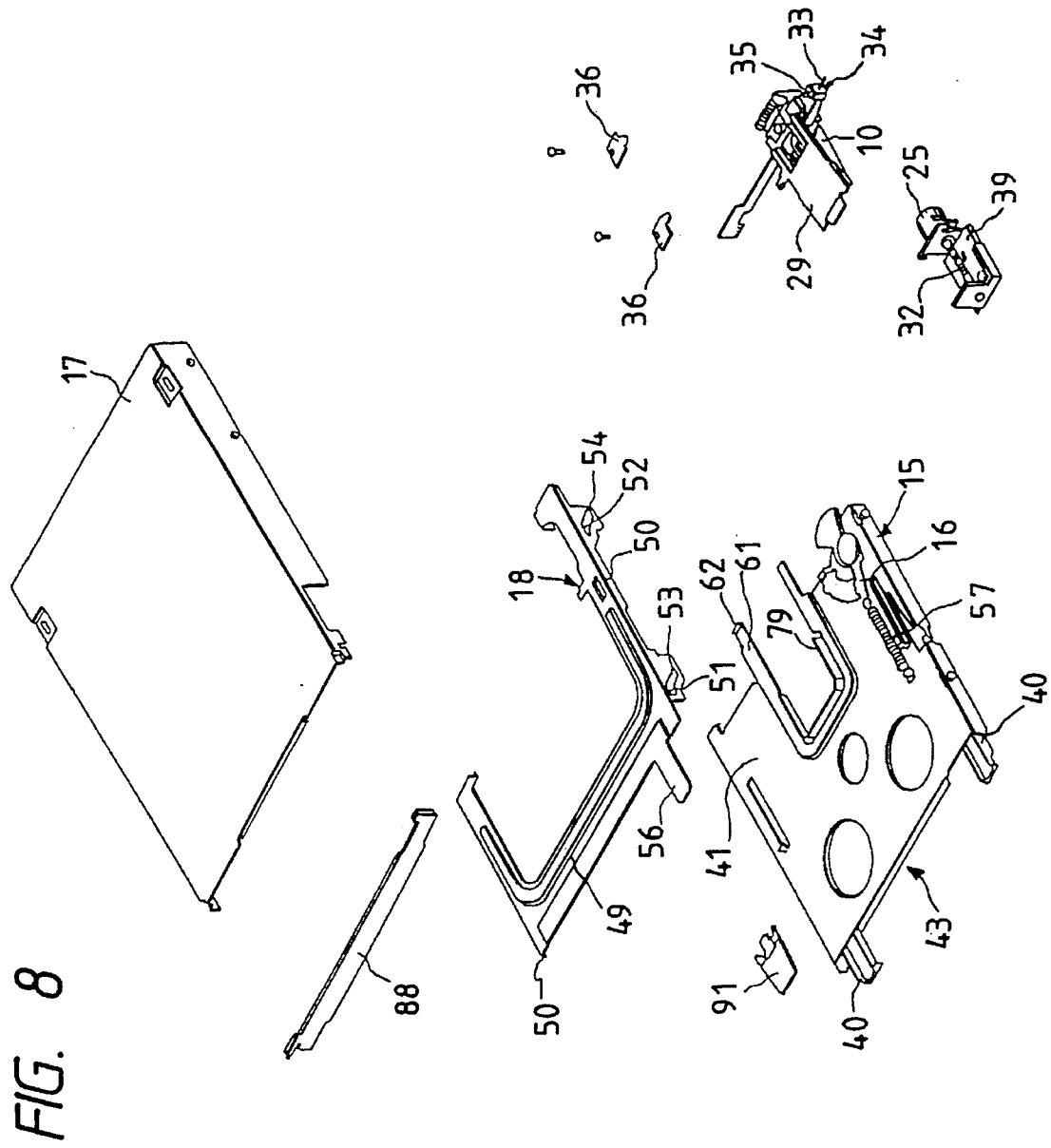
FIG. 8 is an exploded perspective view of the disk drive according to one embodiment of the present invention.

The carriage shifter 12 comprises, as shown in FIG. 8, the carriage 10 mounting the lower magnetic head 8 thereon, a hold case 29 pivotally supported to an end of the carriage opposite to the magnetic head and mounting the upper magnetic head 9 thereon, a guide shaft 30 for supporting the carriage 10 at its lower central portion, a screw shaft 32 disposed in parallel to the guide shaft 30 and having a spiral feed groove 31 engraved on its outer peripheral surface, and a support member 35 projecting from the carriage 10 to support a follower pin 33 and a follower spring 34. Denoted by 36 is a guide shaft retainer for fixing the guide shaft 30 to the chassis 7. The carriage 10 is slidably supported on the guide shaft 30 via a bearing to move in a radial direction of the magnetic disk 11 placed on the turntable 13. As shown in FIG. 7, the follower pin 33 is molded integrally with the support member 35 and the follower spring 34 is fixed to a lower surface 38 of the support member 35 by a set screw 37. The follower pin 33 is projected in match with a direction of inclination of the feed groove 31. The follower spring 34 and the follower-pin 33 resiliently hold the screw shaft 32 therebetween so that the follower pin 33 is prevented from slipping off from the feed groove 31. The support member 35 projecting from the carriage 10 is formed such that the lower surface 38 is sloped to make the support member tapered toward its distal end, with the follower spring 34 fixed to the lower surface 38 by the set screw 37. The sloped follower spring 34 can provide a required resilient force even if it is made thinner than a follower spring arranged horizontally. Additionally, the support member 35 can be increased in thickness (and hence in rigidity).

The screw shaft 32 is coupled at its one end to the stepping motor 25, as shown in FIGS. 1 and 8, so that it is rotated in synchronism with rotation of the stepping motor 25. When the screw shaft 32 is rotated, the follower pin 33 converts the rotating movement into linear movement, whereby the carriage 10 is reciprocated along the guide shaft 30 depending on an amount of rotation of the screw shaft 32 and shifted to a commanded track position on the magnetic disk 11. Denoted by 39 is a holder frame for holding the screw shaft 32 and the stepping motor 25.

The cartridge holder 15 comprises, as shown in FIG. 8, a pair of channel-shaped cartridge holding portions 40 located on both sides, and an upper side portion 41 formed of a thin plate and interconnecting the cartridge holding portions 40 together. Lower extensions of the cartridge holding portions 40 support the underside of the disk cartridge 14, and the remaining lower area of the cartridge holder 15 is entirely open, allowing the turntable 13 and a later-described hub 42 of the magnetic disk 11 to position facing each other. The cartridge holder 15 has a cartridge insertion opening 43 on the side A through which the disk cartridge is inserted. The cartridge holding portions 40 of the cartridge holder 15 are provided with projections 46, 46 engaging a guide groove 44 and a guide cutout 45 (described later) of the chassis 7. Further, the cartridge holder 15 is always resiliently urged by a coil spring (not shown) toward the chassis 7.

Figure 2:
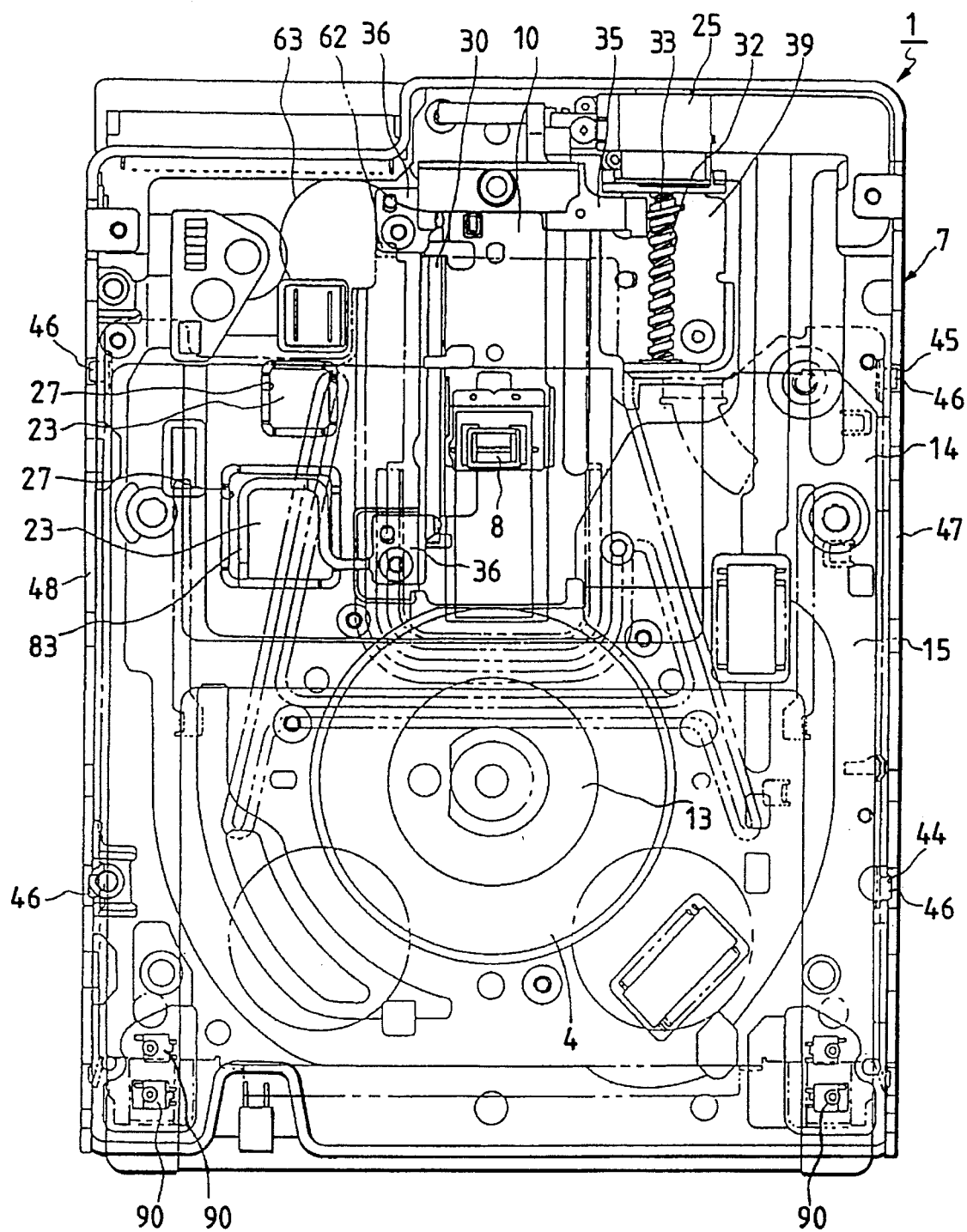
FIG. 2 is a top plan view showing the disk drive according to one embodiment of the present invention, when seen through a cartridge holder and a disk cartridge.
Figure 5A:
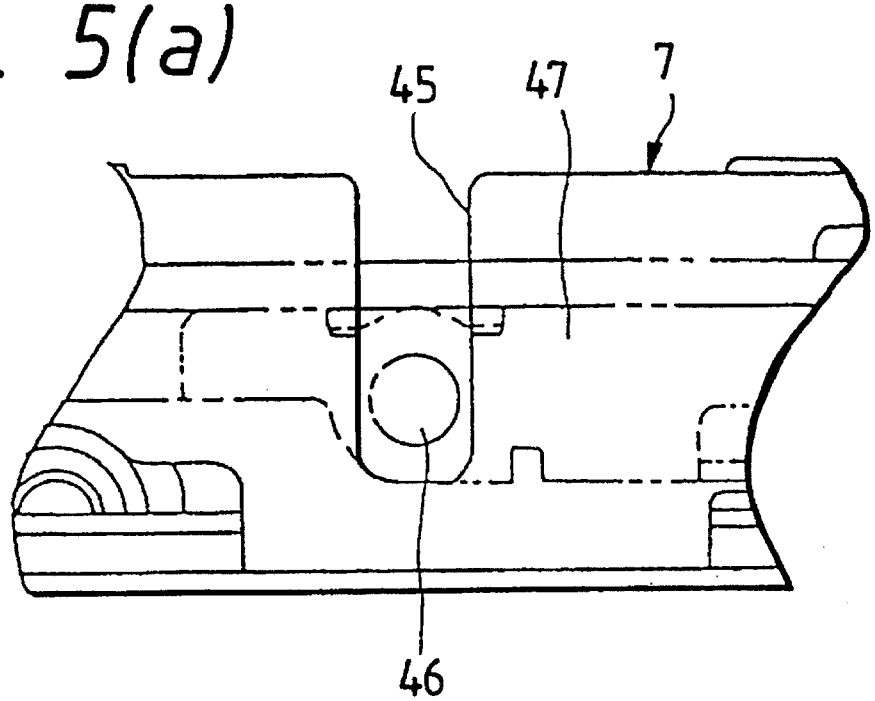
FIGS. 5(a) and 5(b) are respectively side and top plan views of principle parts showing a guide condition of the cartridge holder in the disk drive according to one embodiment of the present invention.
Figure 5B:
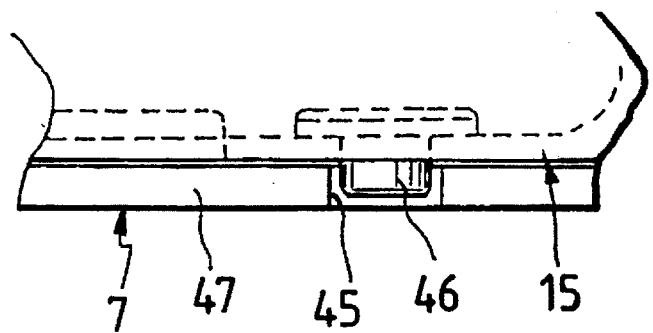
Figure 6A:
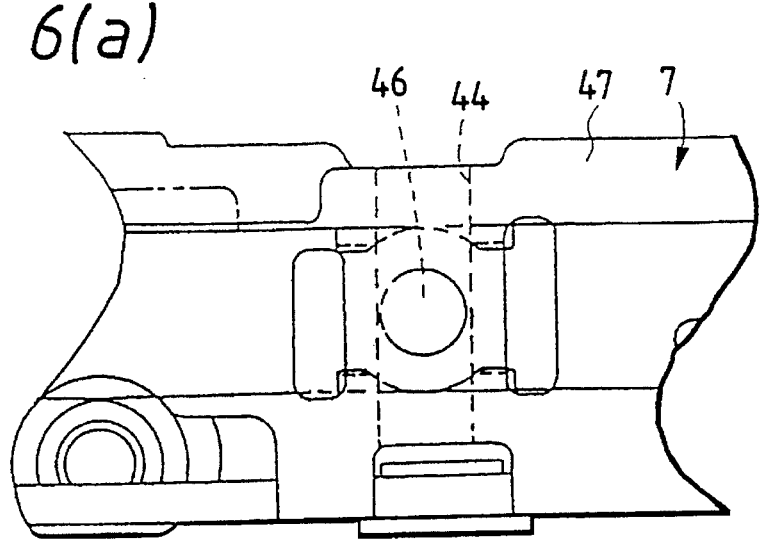
FIGS. 6(a) and 6(b) are respectively side and top plan views of principle parts showing a guide condition of the cartridge holder in the disk drive according to one embodiment of the present invention.
Figure 6B:
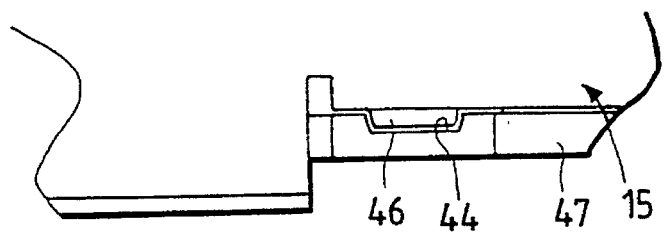

As shown in FIGS. 2, 5 and 6, side plates 47, 48 of the chassis 7 are each formed in its inner surface with the guide groove 44 and the guide cutout 45 for guiding the projections 46 provided on the cartridge holding portions 40 of the cartridge holder 15. The cartridge holder 15 is moved almost vertically with respect to the chassis 7 while being guided by the guide grooves 44 and the guide cutouts 45, thereby loading and unloading the magnetic disk 11. This movement is effected by a later-described cam mechanism which is disposed on an upper surface of the cartridge holder 15 and causes the cartridge holder 15 to move vertically upon shift of the slide plate 18 movable over the upper surface of the cartridge holder 15 in parallel relation. When an eject button 91 coupled to the slide plate 18 is pushed toward the innermost side of the chassis 7 with the cartridge holder 15 kept in its loaded state, the cartridge holder 15 is thereby pushed upwardly, i.e., in an unloading direction.

As shown in FIGS. 1 and 4, the slide plate 18 is mounted to an upper surface of the cartridge holder 15 and is allowed to slide in a back-and-forth direction relative to the cartridge holder 15 (or the chassis 7). The slide plate 18 comprises an upper side plate 49 and a pair of side plates 50, 50 bent downwardly from both side edges of the upper side plate 49. One of the side plates 50, 50 of the slide plate 18 is provided at front and rear two locations with parallel cam slot 51, 52 extending in parallel to the upper surface of the chassis 7 and engaging the projections 46 which slide therein during an unloading operation, and with oblique cam slots 53, 54 formed to slope downwardly toward the rear (innermost) side relative to the chassis 7 for descending the cartridge holder 15 during a loading operation and ascending it during an eject operation. The front and rear parallel cam slots 51, 52 are arranged such that one (the front parallel cam slot 51) of them which is nearer to the cartridge insertion side A is higher than the other (the rear parallel cam slot 52). The disk cartridge 14 is obliquely inserted, as explained later, and then brought into a horizontal posture when the cartridge holder 15 is descended down to its loaded position. Further, the slide plate 18 is always urged by a pair of slide springs 55 toward the cartridge insertion side A. The slide plate 18 is locked and held by the eject lever 16 at the loaded position, i.e., at the pushed-in position. The parallel cam slots 51, 52, the oblique cam slots 53, 54, the guide grooves 44, the guide cutouts 45, the projections 46, etc. cooperatively constitute the cam mechanism. The slide plate 18 is integrally provided with a plurality of control button attaching portions 56, 56, . . . and the other control button attaching portions 56, then one or more at desired positions are removed later. Thus, just by cutting away the control button attaching portions 56 of the slide plate 18 except one at a desired position, for example, the slide plate 18 of the type shown in FIG. 8 can be obtained to be adapted for any of various user demand.

In an upper right region of the cartridge holder 15 in FIG. 1, the eject lever 16 is pivotally supported by a support shaft 58 under such a condition that it is always resiliently biased by an eject spring 57 in an eject direction (i.e., in a counterclockwise direction). Upon rotation of the eject lever 16, a pivoting end of the elect lever 16 abuts against one side end of a shutter 59 of the disk cartridge 14 for opening the shutter 59. It should be understood that when the disk cartridge 14 is inserted and the cartridge holder 15 is descended, the eject lever 16 engages a lock member (not shown) so that the eject lever 16 is prevented from rotating in a direction of arrow C and locked in its pushed-in state.

As shown in FIGS. 1 and 8, the cartridge holder 15 has an arm contacting portion 61 which contacts an arm 60 of the hold case 29 for initially opening the hold case 29 and is provided at its distal end with a guide lug 62 formed to bend upwardly. Even if the distal end of the arm contacting portion 61 is located close to an FPC cable 63 wired for connection to the magnetic heads upon shift of the carriage 10, the guide lug 62 guides the FPC cable 63 to come into below a lower surface of the guide lug 62 so that the FPC cable 63 will not strike against the distal end of the arm contacting portion 61 to be protected from being damaged.

Figure 21:
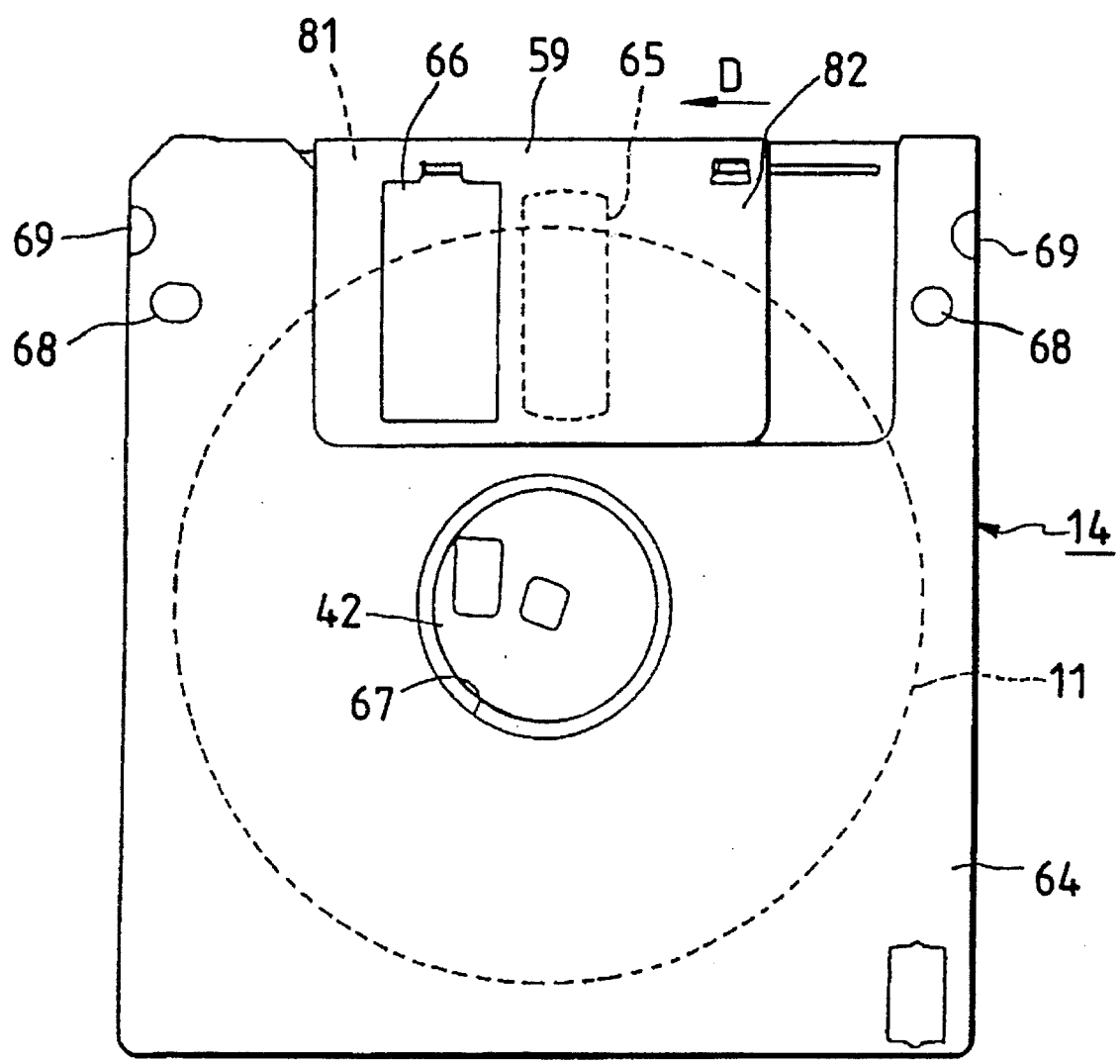
FIG. 21 is a bottom view of the disk cartridge for use in the disk drive according to one embodiment of the present invention.

As shown in FIG. 21, the disk cartridge 14 comprises a hard case 64 made of synthetic resin in which the flexible magnetic disk 11 is contained. The shutter 59 made of metal is attached to one end of the case 64 in a reciprocally movable manner under such a condition that the shutter 59 is always resiliently biased by a built-in spring (not shown) in a closing direction (indicated by arrow D). The shutter 59 is formed in its predetermined position with an opening 66 of almost the same configuration as a head insertion hole 65 formed in the case 64. When the shutter 59 is made open, the head insertion 65 is aligned with the opening 66, allowing the magnetic heads 8, 9 to come into slide contact with the magnetic disk 11 externally of the case 64. The case 64 is formed in its bottom surface with a hub protruding hole 67 through which the hub 42 of the magnetic disk 11 is exposed to the outside of the case 64, and with positioning holes 68 for positioning the disk cartridge 14. Additionally, engaging grooves 69 for use in loading are each formed to be open to both the bottom surface and one of both lateral surfaces.

Figure 9:
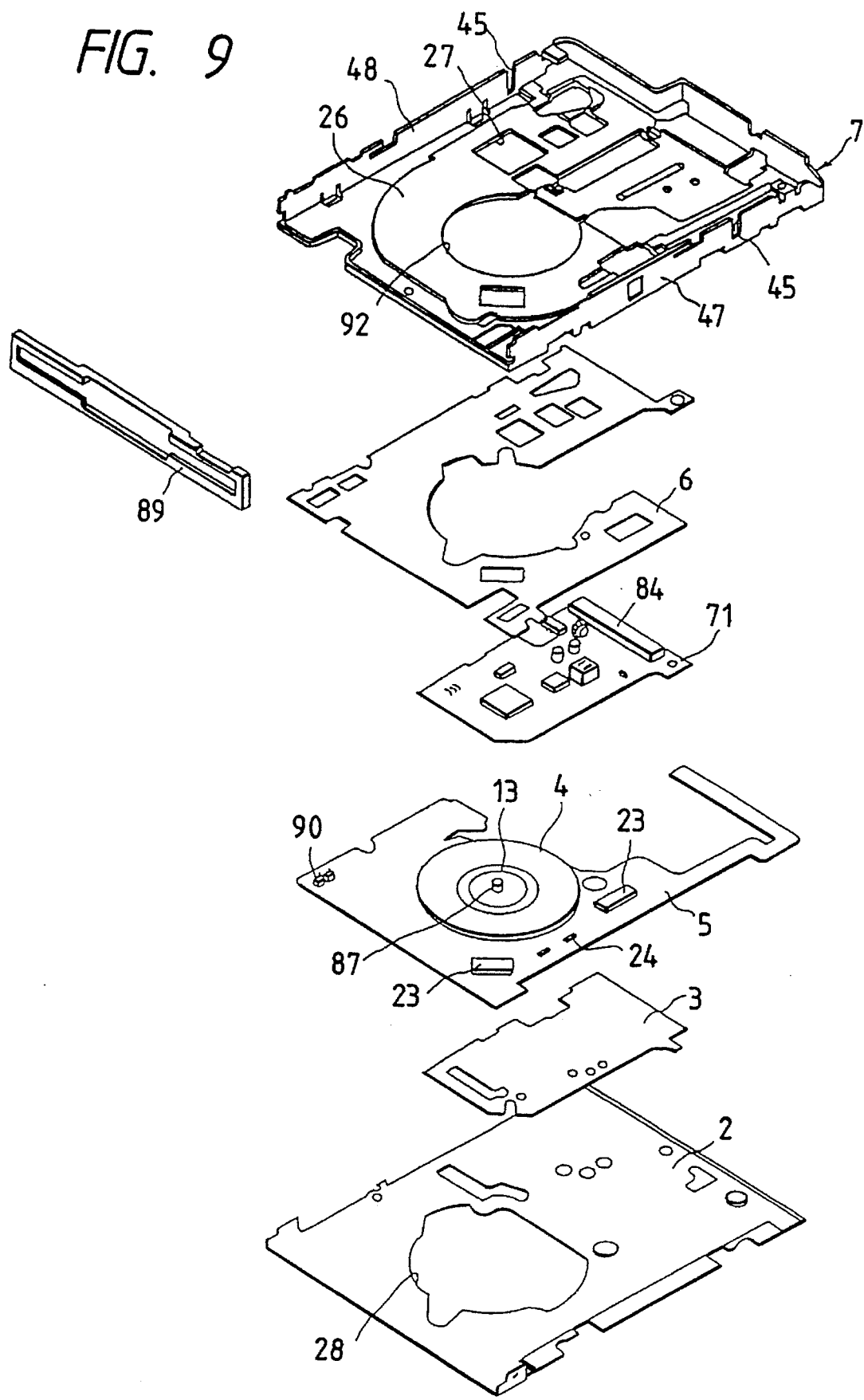
FIG. 9 is an exploded perspective view of the disk drive according to one embodiment of the present invention.
Figure 16A:
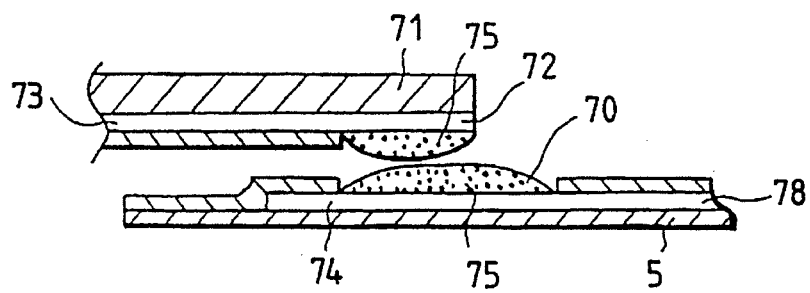
FIGS. 16(a) and 16(b) are explanatory views respectively showing states before and after FPC connection in the disk drive according to one embodiment of the present invention.
Figure 16B:
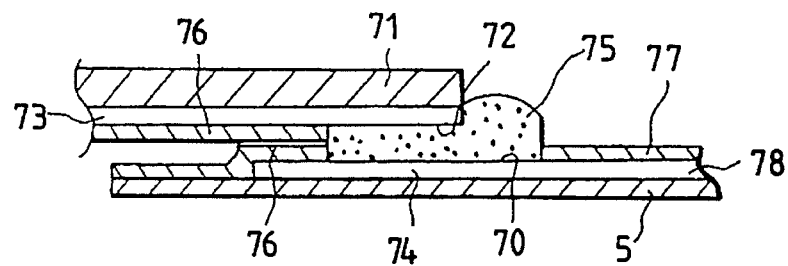

As shown in FIGS. 9 and 16, the FPC 5 and a printed circuit board (PCB) 71 have such a soldering structure that a soldering portion 70 of the FPC 5 is not partly overlapped with a soldering portion 72 of the PCB 71. Denoted by 73 is a copper foil formed in the PCB 71 and 74 is a copper foil formed in the FPC 5. A solder 75 which is melted and overflows between the PCB 71 and the FPC 5 is blocked by a resist 76 to be prevented from leaking to the side of the PCB 71 and is forced to leak to the side of the FPC 5 through a part of the soldering portion 70 of the FPC 5 which is left open, as shown in FIG. 16(b). However, since the remaining connecting portion of the FPC 5 is covered with a resist 77, an adjacent connection terminal 78 is kept from being accidentally connected with the overflown solder 75.

Figures 10A, 10B:
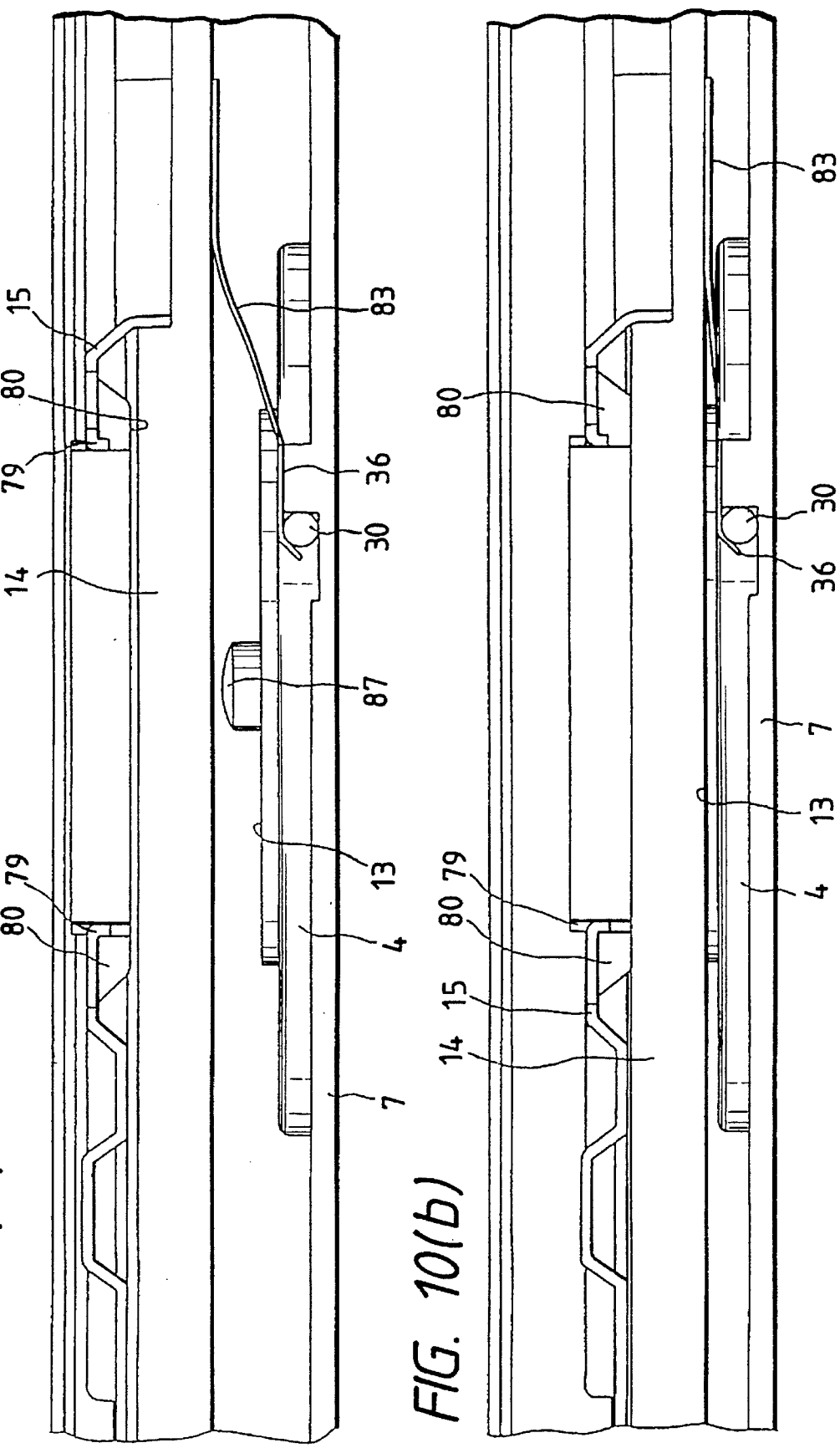
FIGS. 10(a) and 10(b) are explanatory views respectively showing a loaded state and an unloaded state of a cartridge retaining mechanism in the disk drive according to one embodiment of the present invention.
Figure 13:
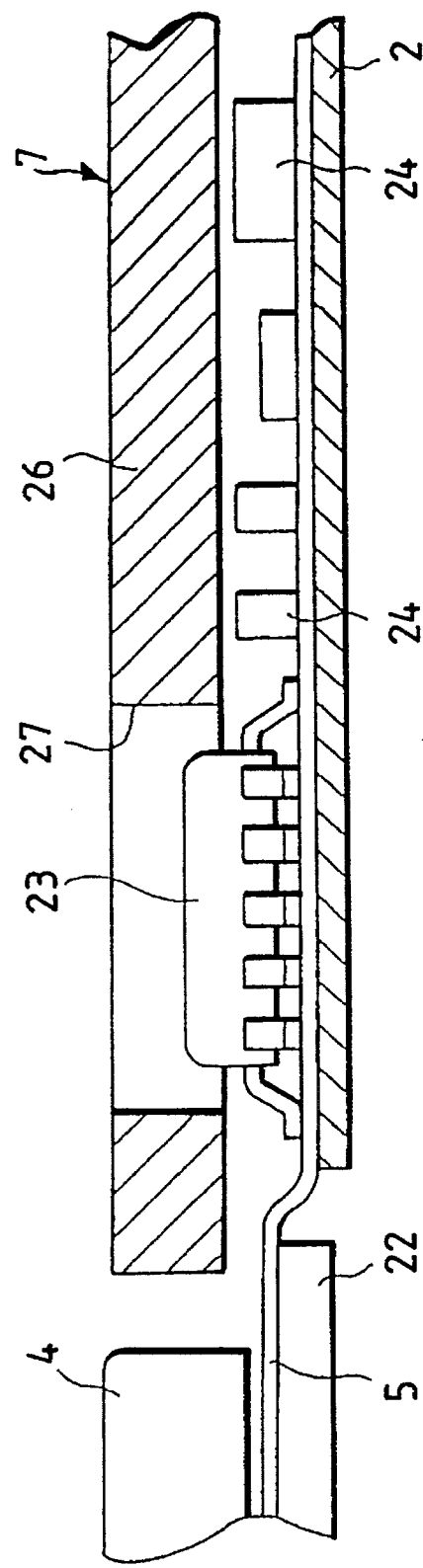
FIG. 13 is a vertical sectional view taken in a direction passing a spindle motor circuit element in the disk drive according to one embodiment of the present invention.
Figure 14:
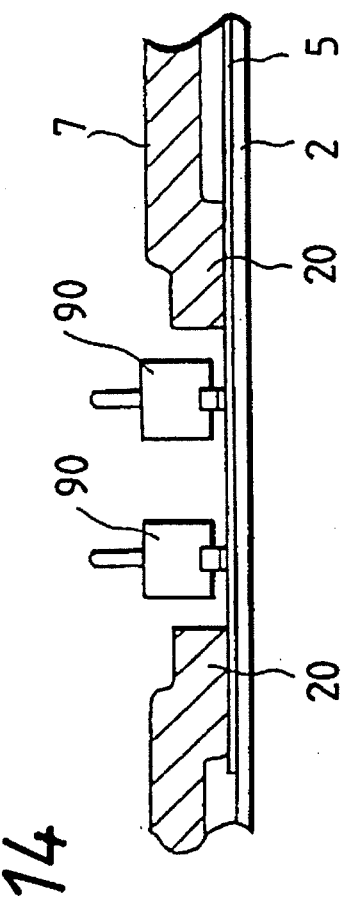
FIG. 14 is a vertical sectional view showing an FPC retaining condition in the disk drive according to one embodiment of the present invention.
Figure 15:
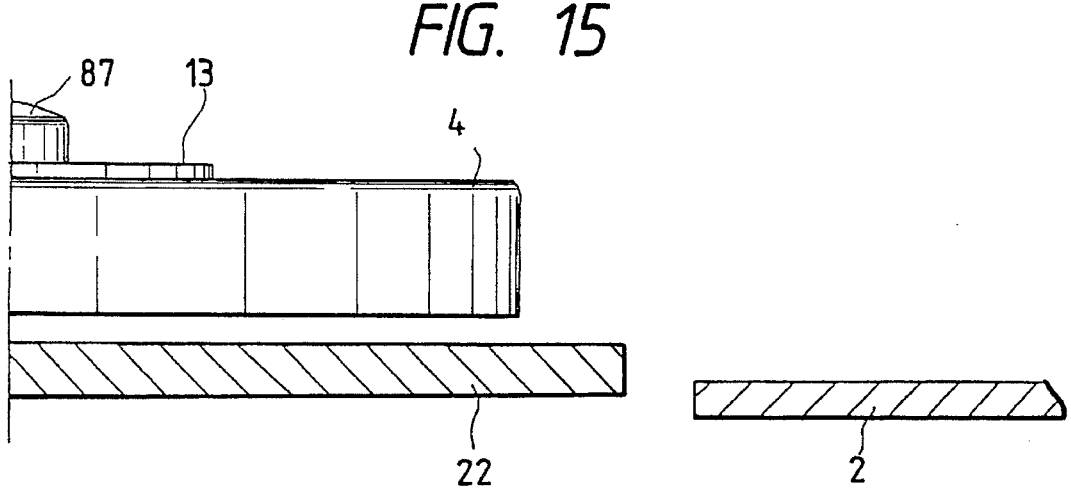
FIG. 15 is a vertical sectional view in the vicinity of the spindle motor in the disk drive according to one embodiment of the present invention.

As shown in FIGS. 1, 8 and 10, the cartridge holder 15 is provided with a magnetic head protecting wall 79 and a shutter restricting portion 80 which are continuously formed into an integral structure. The shutter restricting portion 80 serves to retain an upper side piece 81 of the shutter 59 of the disk cartridge 14 from above, as shown in FIG. 10(b). Therefore, the shutter 59 will not happen to open in such a manner as to strike against the upper magnetic head 9 and damage its parts, thereby ensuring the smooth loading operation.

Figure 3:
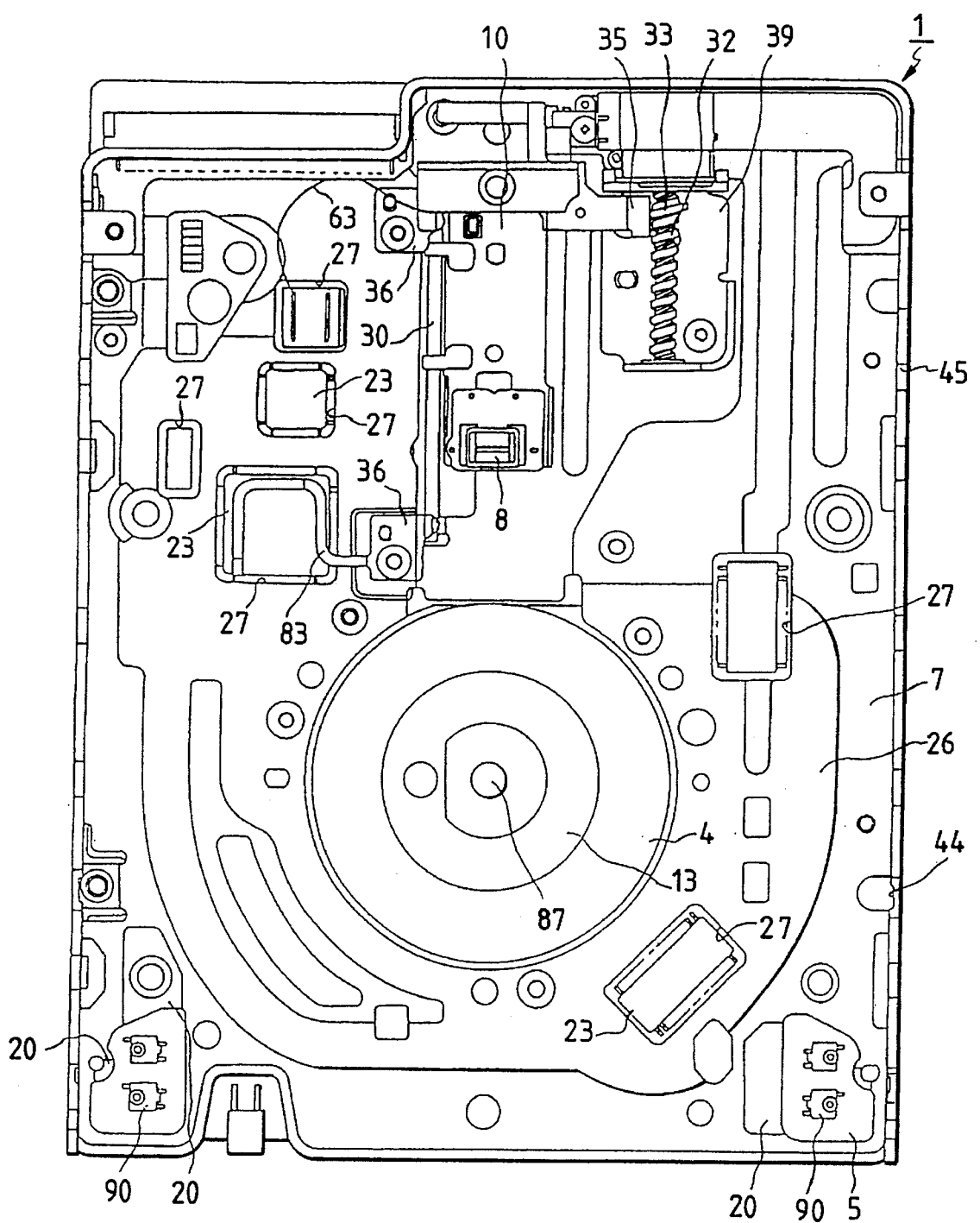
FIG. 3 is a top plan view showing the disk drive according to one embodiment of the present invention with the cartridge holder omitted.

As shown in FIGS. 2, 3 and 10, there is provided a retainer 83 for retaining a lower side piece 82 of the shutter 59 of the disk cartridge 14 from below. The retainer 83 is formed, as shown in FIG. 20, such that it has a substantially channel-like shape in a top plan view and is bent upwardly to come into pressure contact with the lower side piece 82 of the shutter 59 of the disk cartridge 14 which is inserted into the cartridge holder 15. The substantially channel-like shape of the retainer 83 corresponds to the configuration of the aforesaid opening 27 of the chassis 7. Additionally, the guide shaft retainer 36 is integrally formed with a base portion of the retainer 83. Because the retainer 83 serves to retain the lower side piece 82 of the shutter 59 of the disk cartridge 14 from below, as shown in FIG. 10(b), the shutter 59 will not happen to open in such a manner as to strike against the lower magnetic head 8 and damage its parts, thereby ensuring the smooth loading operation.

Figure 17:
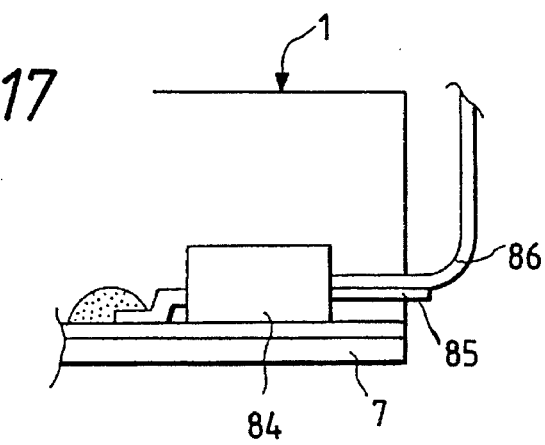
FIG. 17 is an explanatory view showing a connector in the disk drive according to one embodiment of the present invention.

As shown in FIGS. 1 and 17, a connector 84 attached to the chassis 7 is arranged at a position retracted from the side face of the disk drive 1. An amount of this retraction corresponds to the sum of the length of the connector 84 and the length of a reinforcing plate 85. With such an arrangement, even if a cord 86 led out of the connector 84 is laid upwardly, for example while drawing a relatively large arc because of the reinforcing plate 85 commonly used with the connector 84, the space corresponding to almost a radius of the arc-shaped cord can be absorbed by a vacant space in the chassis 7, thus requiring no excessive space outside the disk drive.

Figure 22:
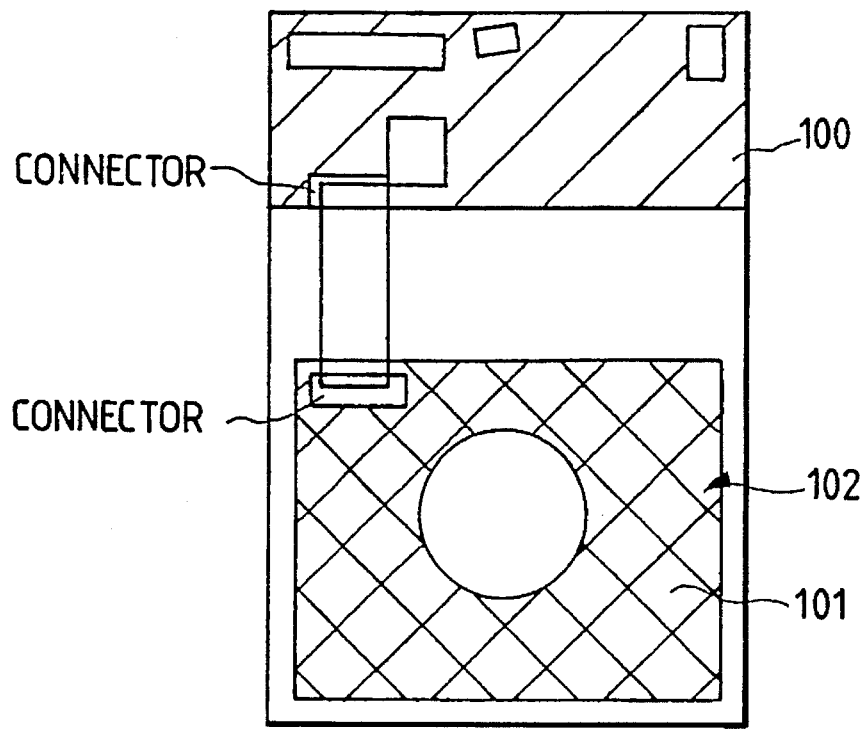
FIG. 22 is an explanatory view showing arrangement of a printed circuit board in a conventional disk drive.

As shown in FIG. 11, the FPC 5 being of a one-sided or multi-layered structure and having flexibility is used as a circuit board. In the prior art, as shown in FIG. 22, a similar circuit board has been constituted by a main PCB 100 for mounting primary parts thereon and a motor PCB 102 for mounting a spindle motor drive circuit 101 thereon. Because of the necessity of not only interconnecting the two PCB's 100, 102, but also connecting non-primary parts (such as the zero track sensor, the magnetic head and the stepping motor) to the PCB's 100, 102, there have been many connection points and a certain number of connectors have been required. With this embodiment, however, eliminating the necessity of using connectors enables a reduction in the number of parts and the cost, and also obviates the need of boring holes for connectors in the chassis 7, with the result of improved rigidity of the chassis and less limitations upon design of the thinner disk drive 1. Use of the FPC also enables design of making the disk drive 1 still thinner. Since the PCB used for primary parts in the prior art is omitted by using the FPC, it is possible to remarkably reduce the number of parts and the cost. Moreover, the disk drive 1 can be reduced in weight as compared with the case of using the PCBs. The space which has not been useful for a conventional hard PCB becomes available to install the FPC, which further contributes to a reduction in thickness of the disk drive 1. The cost of the FPC as a single product can be cut down by appropriately designing its configuration. Additionally, the reduced total number of connections necessary for the entire disk drive enables a reduction in the manufacture cost. Furthermore, since a resonance mode occurs at lower frequency when the disk drive 1 is subjected to vibrations, the internal mechanism is less affected and hence environmental durability is improved. A lower degree of rigidity of the FPC 5 prevents the same from distorting when attached to the chassis 7, and lessens an adverse influence upon the attachment. Thus, the FPC 5 can be directly connected to movable parts (such as the zero track sensor and the magnetic head) with sufficient adaptability. Only one connector 84 for the interface purpose is required and the internal circuits can be achieved without any connectors.

Figure 18:
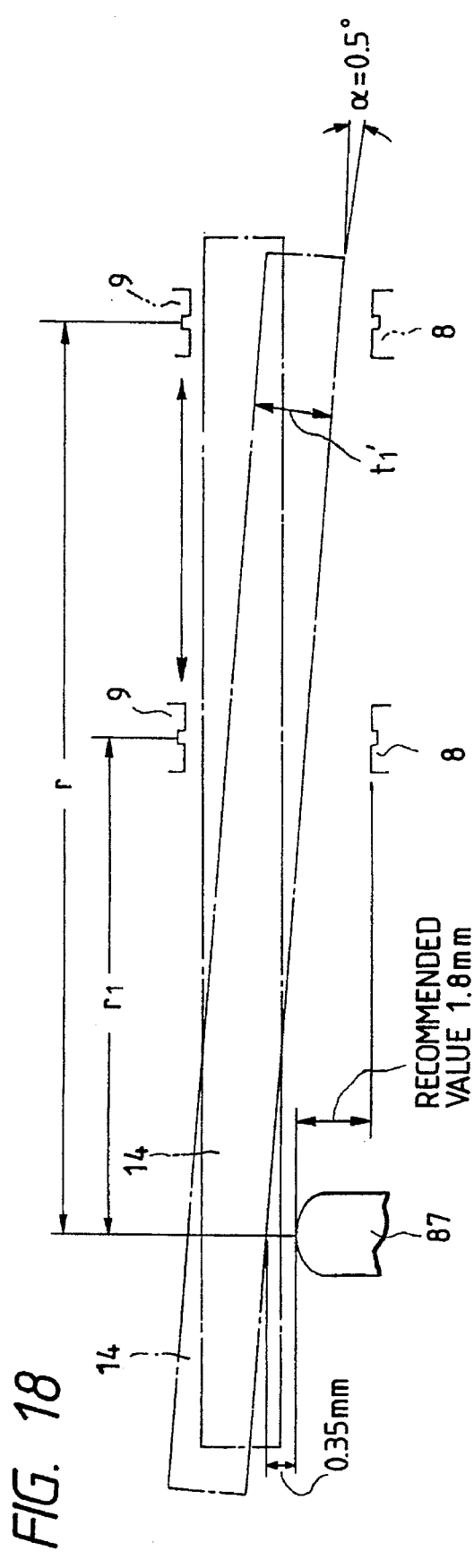
FIG. 18 is an explanatory view showing the principle of oblique insertion in the disk drive according to one embodiment of the present invention.
Figure 19:
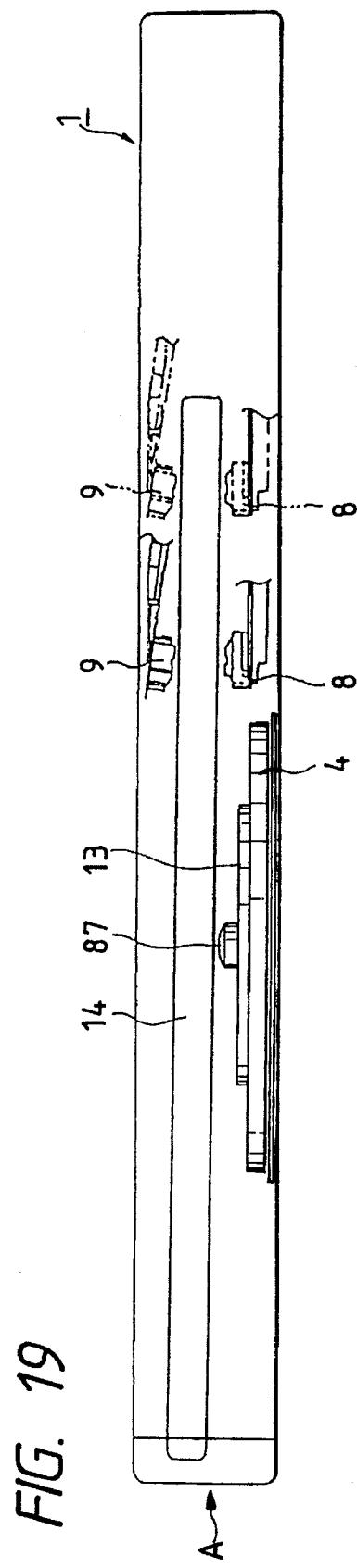
FIG. 19 is an explanatory view showing an innermost peripheral position and an outermost peripheral position of a head in the disk drive according to one embodiment of the present invention.

Turning now to insertion of the disk cartridge 14, since the cartridge holder 15 is held inclined at an angle of 0.5° with the innermost side set at a lower position, the disk cartridge 14 (or the magnetic disk 11) is obliquely inserted such that an upper surface of the disk cartridge 14 (or the magnetic disk 11) will not strike against the upper magnetic head 9 when the upper and lower magnetic heads 9, 8 are in their innermost peripheral positions, and a lower surface of the disk cartridge 14 will not strike against the lower magnetic head 8 when the upper and lower magnetic heads 9, 8 are in their outermost peripheral positions. More specifically, for insertion of the disk cartridge 14 into the cartridge holder 15, the distance between the lower surface of the disk cartridge 14 and a shaft end 87 of the turntable 13, the distance between the upper surface of the disk cartridge 14 and the upper magnetic head 9 in its innermost peripheral position, and the distance between the lower surface of the disk cartridge 14 and the lower magnetic head 8 in its outermost peripheral position are set equal to one another, by way of example, as shown in FIG. 18. On such an assumption, there holds a relationship of tan α×r=t (where α: angle of inclination at which the disk cartridge 14 is inserted, r: distance from the shaft end 87 of the turntable 13 to the outermost peripheral positions of the upper and lower magnetic heads 9, 8, and t: allowable descent amount of the disk cartridge 14 at the outermost peripheral positions of the upper and lower magnetic heads 9, 8. Here, given that r=39.5 mm and t=0.35 mm [this value is derived from t=(d1−t1)/2=(4.2 mm−3.5 mm)/2=0.35 mm on an assumption that the disk cartridge 14 has a thickness t1=3.5 mm as the sum of its actual thickness t1'=3.3 mm and an error of ±0.2 mm, and a maximum warp of the disk cartridge 14 is d1 =4.2 mm], α=0.5° is obtained. Accordingly, a descent amount of the disk cartridge 14 at the innermost peripheral position of the upper magnetic head 9 is given by almost r1×tan 0.5° (where r1: distance from the shaft of the turntable 13 to the innermost peripheral position of the upper magnetic head 9). Thus, as compared with the prior art disk cartridge which is inserted in parallel, the thickness of the entire disk drive unit 1 can be reduced by the amount of r1×tanα in this embodiment.

Note that denoted by 88 is an opening/closing flap attached to the cartridge insertion side A, 89 is a front plate to which the opening/closing flap 88 is attached in such a manner as able to open and close, and 90 is a detection switch for media IN, ½·4 MB or write protection.

A description will now be given of loading and unloading operations of the disk drive 1 constructed as explained above.

Figure 4A:
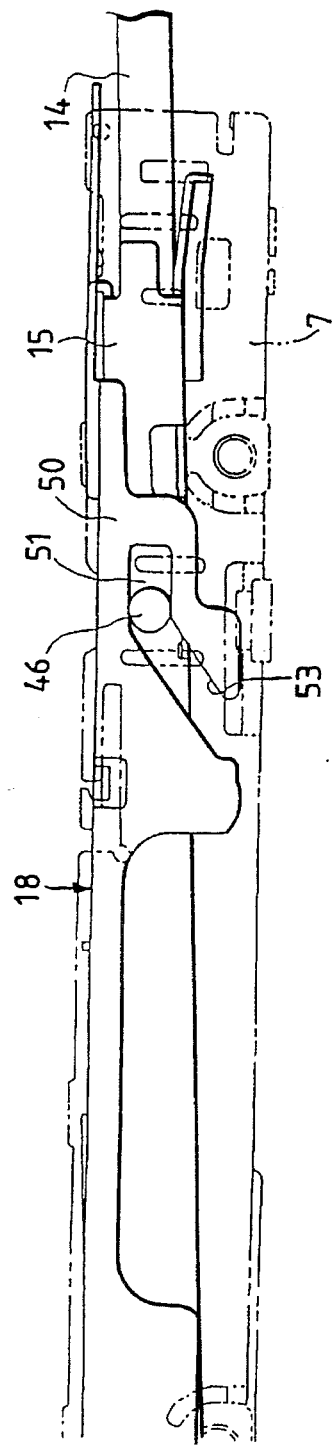
FIGS. 4(a), 4(b) and 4(c) are explanatory views showing an insert operation of the disk cartridge in the disk drive according to one embodiment of the present invention.
Figure 4B:
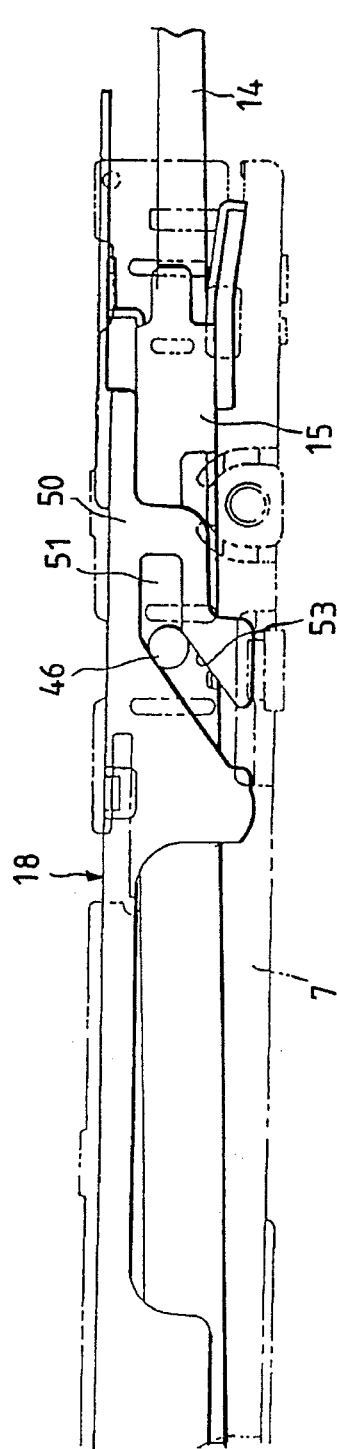
Figure 4C:
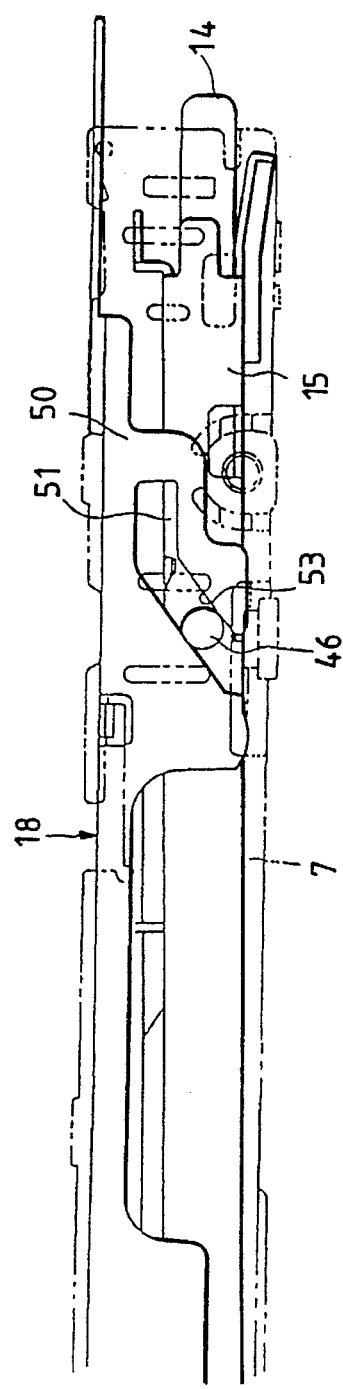

When the disk cartridge 14 is inserted in an unloaded state shown in FIG. 4(a), it is obliquely inserted at the beginning corresponding to an unloaded position. Then, the pivoting end of the eject lever 16 abuts against one side of the shutter 59 of the disk cartridge 14. Upon the disk cartridge 14 being further pushed in, the eject lever 16 is pivoted about its support shaft 58 to make the shutter 59 open by the pivoting end of the eject lever 16, while the disk cartridge 14 goes on advancing. When the disk cartridge 14 is inserted until the innermost side of the cartridge holder 15, the slide plate 18 is unlocked, though not shown, and moved downwardly in FIG. 1 (i.e., toward the front side of the disk drive 1) by resilient forces of the slide springs 55. At the time the slide plate 18 is unlocked, the shutter 59 is fully opened. Further, when the slide plate 18 is slid in the direction of arrow B up to such a position as where the hub 42 of the disk cartridge 14 positions just above the turntable 13 and the disk cartridge 14 can no longer advance, the projections 46 of the cartridge holder 15 are positioned in upper portions of the oblique cam slots 53, 54 formed in the side plates 50 of the slide plate 18, as shown in FIG. 4(b). After that, under a combination of the resilient forces urging the cartridge holder 15 toward the chassis 7 and an action of the oblique cam slots 53, 54 formed in the side plates 50 of the slide plate 18, the slide plate 18 is further slid to move in the direction of arrow B, whereas the cartridge holder 15 is vertically descended toward the chassis 7 along the guide grooves 44 and the guide cutouts 45, so that the magnetic disk 11 is loaded on the turntable 13, as shown in FIG. 4(c), and the magnetic heads 8, 9 enter the case 64 through the head insertion hole 65 to contact the magnetic disk 11 for enabling recording/playback.

In this way, the upper magnetic head 9 on the hold case 29 touches the magnetic disk 11 and holds the magnetic disk 11 between itself and the lower magnetic head 8 on the cartridge 10, thereby establishing the loaded state. The operation for loading the magnetic disk 11 is thus completed.

When the disk cartridge 14 is taken out after recording or playback, the eject operation is performed. In the eject operation, when the eject button 91 is pushed toward the innermost side of the chassis 7, the slide plate 18 is also moved toward the innermost side and the projections 46 of the cartridge holder 15 are pushed up along the oblique cam slots 54, 54 so that the projections 46 locate in the parallel cam slots 51, 52. Therefore, the cartridge holder 15 is moved upwardly (i.e., in a direction away from the chassis 7) to come into the unloaded state. When the eject button 91 is further pushed inwardly, the slide plate 18 is locked in its innermost position. Upon that movement of the slide plate 18, the eject lever 16 is unlocked to pivot by the resilient force of the eject spring 57 in the counterclockwise direction in FIG. 1 about the support shaft 58 for ejecting the disk cartridge 14 in the direction of arrow B. During the eject process, the shutter 59 of the disk cartridge 14 engaging the eject lever 16 is moved in the closing direction so that the shutter is fully closed when the disk cartridge 14 is ejected. Thus, the eject lever 16 also functions as a shutter opening/closing lever. After being ejected in such a manner, the disk cartridge 14 can be manually taken out.

It should be understood that, in the above process, the magnetic disk 11 is obliquely inserted and ejected such that the upper surface of the magnetic disk 11 will not strike against the upper magnetic head 9 when the upper and lower magnetic heads 9, 8 are in their innermost peripheral positions, and the lower surface of the magnetic disk 11 will not strike against the lower magnetic head 8 when the upper and lower magnetic heads 9, 8 are in their outermost peripheral positions.

With the embodiment constructed as explained above, in the disk drive 1 comprising the spindle motor 4 for rotating the magnetic disk 11 inserted and loaded in place, a circuit board connected the spindle motor 4, and the lower cover 2 for accommodating both the spindle motor 4 and the circuit board, the FPC 5 is used in place of a conventional printed circuit board, the spindle motor 4 is constituted by mounting circuit parts for the spindle motor 4 on the FPC 5 and fixing the FPC 5 to the back yoke 22, the lower cover 2 is provided with the opening 28, the FPC 5 is interposed between the chassis 7 and the lower cover 2, and further the back yoke 22 of the spindle motor 4 is assembled by being inserted into the opening 28 of the lower cover 2. Furthermore, the chassis 7 is formed to be projected in areas where there is no limitation in the part height and to be recessed in areas where there is a limitation in the part height. The underside of the chassis 7 is, as shown in FIG. 12, brought into close contact with the lower cover 2. In the region where the FPC 5 is interposed, the chassis 7 is formed into a projecting portion 26 so as to accommodate the FPC 5, the IC device 23 and the chip parts 24. While the chip parts 24 can be accommodated in a space defined by the projecting portion 26, the IC device 23 is too high to be placed in that space. Therefore, the opening 27 is formed in the chassis 7 to accommodate the IC device 23 therein. Further, since the stepping motor 25 and the FPC 5 are integrated together, the area of the back yoke 22 can be reduced to make the weight smaller correspondingly. In addition, the zero track sensor, the stepping motor 25 and the spindle motor 4 are interconnected by one sheet of FPC 5, and the various switches 90 can be directly soldered to the FPC 5. With the FPC 5 thus held in contact with the lower cover 2, a reference position can be established by the lower cover 2 and rigidity can be enhanced. Moreover, with the FPC 5 bonded to the back yoke 22, there is no need of fabricating the back yoke 22 such that it can be attached to the FPC 5, thereby enabling a reduction in size of the back yoke 22. Since the opening 28 is formed in the lower cover 2 and the reduced back yoke 22 for the spindle motor 4 is partly placed in the opening 28, the height can also be cut down. As a result, using the FPC 5 makes it possible to reduce total thickness and weight of the unit corresponding to the thickness of a hard printed circuit board no longer used in the present unit and the reduced size of the back yoke.

Also, with the above-explained embodiment, since the FPC 5 and the PCB 71 have such a soldering structure that the soldering portion 70 of the FPC 5 is not partly overlapped with the soldering portion 72 of the PCB 71, the solder 75 which is melted and overflows between the PCB 71 and the FPC 5 is blocked by the resist 76 to be prevented from leaking to the side of the PCB 71 and is forced to leak to the side of the FPC 5 through a part of the soldering portion 70 of the FPC 5 which is left open. However, since the remaining connecting portion of the FPC 5 is covered with the resist 77, the adjacent connection terminal 78 is kept from being erroneously connected with the overflown solder 75.

Further, with the above-explained embodiment, the cartridge holder 15 has the arm contacting portion 61 which contacts the arm 60 of the hold case 29 for initially opening the hold case 29 and is provided at its distal end with the guide lug 62 formed to bend upwardly. To make the disk drive thinner and ensure sufficient initial opening of the hold case 29, the arm 60 of the hold case 29 is preferably lifted at a position nearer to the point at which the hold case 29 is supported in an openable and closable manner. However, if the distal end of the arm contacting portion 61 is extended for that purpose, it is located so closer to the FPC cable 63 wired for connection to the magnetic heads upon shift of the carriage 10 that the FPC cable 63 may strike against the distal end of the arm contacting portion 61 and be damaged. To prevent such a trouble, an FPC cable fixing member has been required in the prior art. In the present invention, however, the guide lug 62 guides the FPC cable 63 to come into below the lower surface of the guide lug 62 so that the FPC cable 63 will not strike against the distal end of the arm contacting portion 61 to be protected from being damaged. As a result, without needing the FPC cable fixing member used in the prior art, the disk drive 1 can be reduced in thickness and weight with the simple construction of providing the guide lug 62 formed to bend upwardly.

Figure 23:
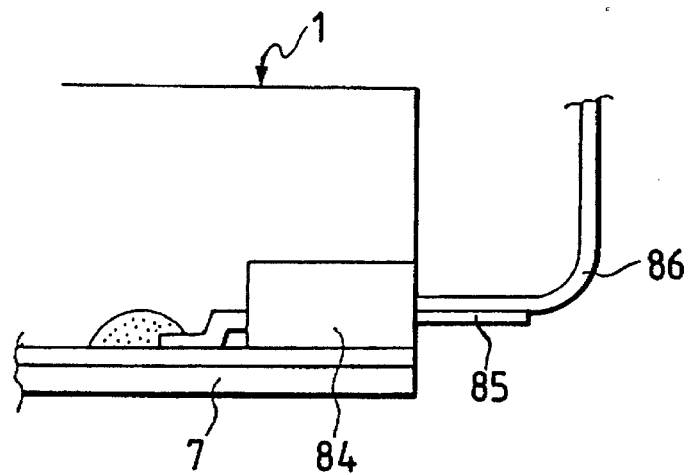
FIG. 23 is an explanatory view showing a connector in a conventional disk drive.

With the above-explained embodiment, the connector 84 attached to the chassis 7 is arranged at a position retracted from the side face of the disk drive 1. In general, the provision of the reinforcing plate 85 commonly used with the connector 84 causes the cord 86, led out of the connector 84, to be laid upwardly for example, while drawing a relatively large arc, whereby the space corresponding to almost a radius of the arc-shaped cord and extending outwardly from the side face of the disk drive 1 must be left useless, as shown in FIG. 23. With the present invention, however, the above space corresponding to almost the radius of the arc-shaped cord can be absorbed by a vacant space in the chassis 7, as is shown in FIG. 17, thus requiring no excessive space outside the disk drive 1.

With the above-explained embodiment, since the support member 35 projecting from the carriage 10 is formed such that its lower surface 38 is sloped to make the support member tapered toward its distal end, and the follower spring 34 is fixed to the lower surface 38 by the set screw 37, as shown in FIG. 7, the sloped follower spring 34 can provide a required resilient force even if it is made thinner than a follower spring arranged horizontally. Additionally, the support member 35 can be increased in rigidity to enable a reduction in thickness of the carriage shifting mechanism.

With the above-explained embodiment, since the FPC 5 being of a one-sided or multi-layered structure and having flexibility is used as a circuit board, the FPC 5 can be directly connected to movable parts (such as the zero track sensor and the magnetic head) with sufficient adaptability. Also, only one connector 84 for the interface purpose is required and the internal circuits can be achieved without any connectors. More specifically, as shown in FIG. 22, a similar circuit board has been constituted in the prior art by the main PCB 100 for mounting primary parts thereon and the motor PCB 102 for mounting the spindle motor drive circuit 101 thereon. Because of the necessity of not only interconnecting the two PCBs 100, 102, but also connecting non-primary parts (such as the zero track sensor, the magnetic head and the stepping motor) to the PCBs 100, 102, there have been many connection points and a certain number of connectors have been required. With the foregoing embodiment, however, eliminating the necessity of using connectors by adoption of the flexible FPC 5 as shown in FIG. 11 enables a reduction in the number of parts and the cost, and also obviates the need of boring holes for connectors in the chassis 7, with the result of improved rigidity of the chassis and less limitations upon design of the thinner disk drive 1. Use of the FPC also enables design of making the disk drive 1 still thinner. Since the PCB used for primary parts in the prior art is omitted by using the FPC, it is possible to remarkably reduce the number of parts and the cost. Moreover, the disk drive 1 can be reduced in weight as compared with the case of using the PCB's. The space which has not been useful for a conventional hard PCB becomes available to install the FPC, which further contributes to a reduction in thickness of the disk drive 1. The cost of the FPC as a single product can be cut down by appropriately designing its configuration as shown in FIG. 11. Additionally, the reduced total number of connections necessary for the entire disk drive 1 enables a reduction in the manufacture cost. Furthermore, since a resonance mode occurs at lower frequency when the disk drive 1 is subjected to vibrations, the internal mechanism is less affected and hence environmental durability is improved. A lower degree of rigidity of the FPC 5 prevents the same from distorting when attached to the chassis 7, and lessens an adverse influence upon the attachment.

Moreover, with the embodiment constructed as explained above, in the disk drive 1 comprising the cartridge holder 15 for holding the disk 14 which contains the magnetic disk 11 in the form of a disk, ascending/descending means for vertically moving the cartridge holder 15 to load the magnetic disk 11 in the disk cartridge 14 held by the cartridge holder 15 on the turntable 13 and unload the magnetic disk 11 from the turntable 13, the spindle motor 4 for rotatively driving the turntable 13, the upper and lower magnetic heads 9, 8 for performing write and/or read of signals in the magnetic disk 11, upper and lower magnetic heads supporting means for supporting the upper and lower magnetic heads 9, 8 in such a manner as able to move toward and away from the magnetic disk 11, and upper and lower magnetic heads shifting means for shifting the upper and lower magnetic heads supporting means in the radial direction of the magnetic disk 11, the magnetic disk 11 is obliquely inserted such that the upper surface of the magnetic disk 11 will not strike against the upper magnetic head 9 when the upper and lower magnetic heads 9, 8 are in their innermost peripheral positions, and the lower surface of the magnetic disk 11 will not strike against the lower magnetic head 8 when the upper and lower magnetic heads 9, 8 are in their outermost peripheral positions. In addition to such insertion of the disk cartridge 14 into the cartridge holder 15, as shown in FIG. 18, the distance between the lower surface of the disk cartridge 14 and the shaft end 87 of the turntable 13, the distance between the upper surface of the disk cartridge 14 and the upper magnetic head 9 in its innermost peripheral position, and the distance between the lower surface of the disk cartridge 14 and the lower magnetic head 8 in its outermost peripheral position are set, by way of example, equal to one another. As a result, in comparison with the prior art disk cartridge which is inserted in parallel, the thickness of the entire disk drive unit 1 can be reduced by the amount of r1×tan α in the foregoing embodiment.

In addition, with the embodiment constructed as explained above, in the disk drive 1 comprising the cartridge holder 15 for holding the disk cartridge 14 which contains the magnetic disk 11 in the form of a disk, ascending/descending means for vertically moving the cartridge holder 15 to load the magnetic disk 11 in the disk cartridge 14 held by the cartridge holder 15 on the turntable 13 and unload the magnetic disk 11 from the turntable 13, the slide plate 18 for operating the ascending/descending means, the spindle motor 4 for rotatively driving the turntable 13, the upper and lower-magnetic heads 9, 8 for performing write and/or read of signals on the magnetic disk 11, and upper and lower magnetic heads shifting means for shifting the upper and lower magnetic heads 9, 8 in the radial direction of the magnetic disk 11, the slide plate 18 is integrally provided with a plurality of control button attaching portions 56, 56, . . . and the other control button attaching portions 56, then one or more at desired positions are removed later. Therefore, the need of manufacturing several types of dies and producing and stocking several types parts can be obviated. Thus, just by cutting away the control button attaching portions 56 of the slide plate 18, produced by using a single die, except one or more at desired positions, the slide plate 18 can be adapted for any of various user demand. Consequently, the cost relating to the dies, the stocking and so on can be cut down to reduce the total production cost.

With the above-explained embodiment, the cartridge holder 15 is provided with the magnetic head protecting wall 79 and the shutter restricting portion 80 which are continuously formed into an integral structure. In the prior art, the upper side piece 81 of the shutter 59 of the disk cartridge 14 may open so that the piece edge may strike against the upper magnetic head 9, with a fear of damaging the shutter 59 and the upper magnetic head 9 and also impeding the smooth loading operation. This fear is increased and has been an obstruction in, particularly, making the disk drive 1 still thinner. In the foregoing embodiment, however, the shutter restricting portion 80 provided on the cartridge holder 15 serves to retain the upper side piece 81 of the shutter 59 of the disk cartridge 14 from above. As a result, the shutter 59 will not happen to open in such a manner as to strike against the upper magnetic head 9 and damage its parts, thereby ensuring the smooth loading operation.

With the above-explained embodiment, there is provided the retainer 83 for retaining the lower side piece 82 of the shutter 59 of the disk cartridge 14 from below. In the prior art, the lower side piece 81 of the shutter 59 of the disk cartridge 14 may open so that the piece edge may strike against the lower magnetic head 8, with a fear of damaging the shutter 59 and lower magnetic head 8 and also impeding the smooth loading operation. This fear is increased and has been an obstruction in, particularly, making the disk drive 1 still thinner. In the foregoing embodiment, however, the retainer 83 serves to retain the lower side piece 82 of the shutter 59 of the disk cartridge 14 from below. As a result, the shutter 59 will not happen to open in such a manner as to strike against the lower magnetic head 8 and damage its parts, thereby ensuring the smooth loading operation.

What is claimed is:

1. A disk drive comprising:

a lower cover having upper surface and including a first opening;

a chassis having a lower surface mounted on said lower cover, the chassis also including a projecting portion which is spaced from the lower cover, thereby forming a retaining area, the projecting portion including a second opening which is aligned with the first opening, the chassis and the lower cover being separate members;

a back yoke fixedly connected to the lower surface of the projecting portion of the chassis such that the back yoke covers a portion of the first opening of the lower cover, the first opening being larger than the back yoke;

a disk driving motor mounted on said back yoke, for rotating a magnetic disk which is inserted and loaded into the disk drive, a portion of said disk driving motor extending through the second opening of said projecting portion of the chassis; and a flexible printed circuit board integrally formed from a single sheet, the flexible printed circuit board including a first portion connected to said disk driving motor and to said back yoke, said flexible printed circuit board being received in a space formed between the projecting portion of said chassis and said lower cover, said flexible printed circuit board including a second portion located on said lower cover upon which is mounted an integrated circuit component, said integrated circuit component being received in the second opening of the chassis, the second opening being larger than a combination of the integrated circuit component and the disk driving motor;

wherein said back yoke is assembled to said disk drive by being inserted into the opening of said lower cover.

2. The disk drive according to claim 1, further comprising a switch directly soldered to the second portion of the flexible printed circuit board.

* * * * *